April 15, 1924.
W. MILLER
AUTOMATIC HEADLIGHT CONTROL
Filed Sept. 7, 1923
1,490,676
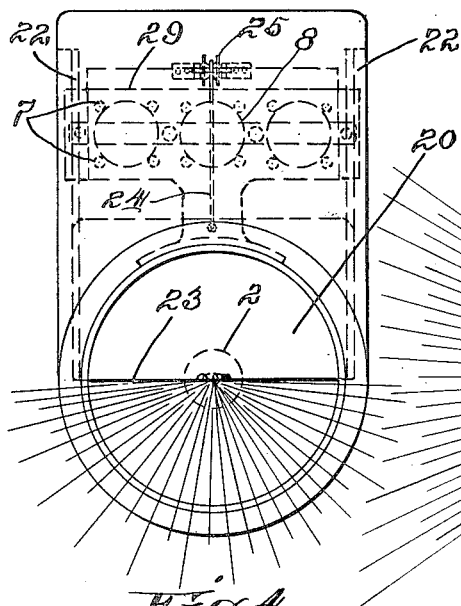
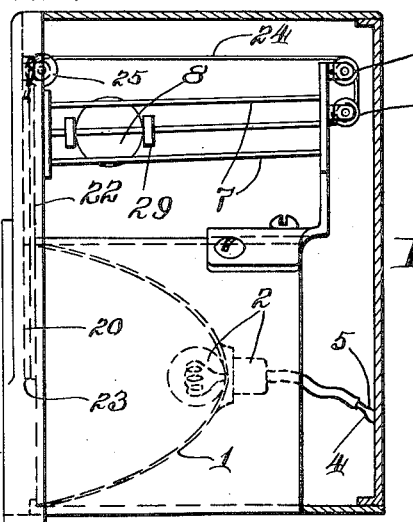
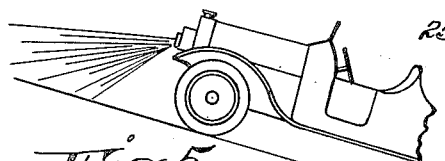
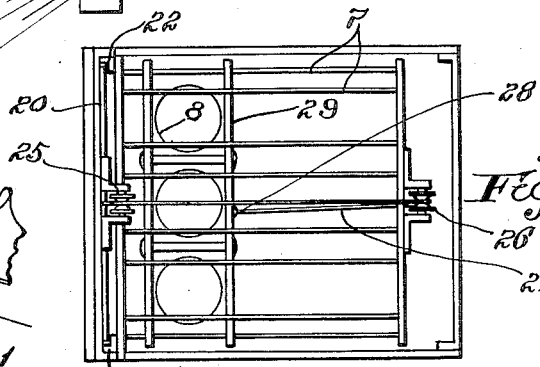
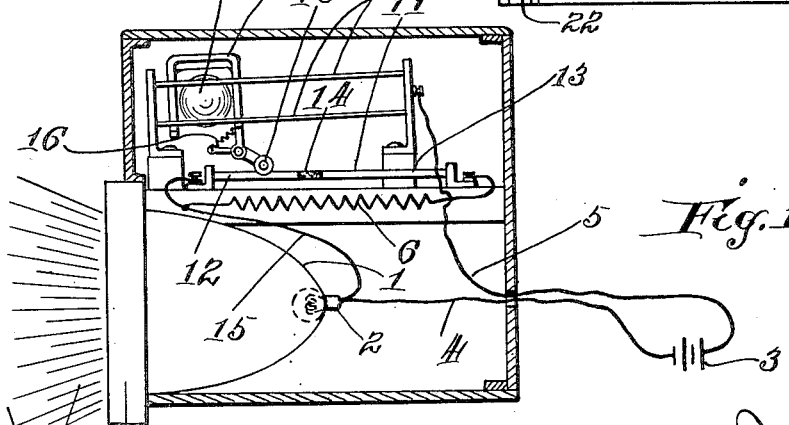

Patented Apr. 15, 1924.

1,490,676

UNITED STATES PATENT OFFICE.

WILLIAM MILLER, OF BALTIMORE, MARYLAND.

AUTOMATIC HEADLIGHT CONTROL.

Application filed September 7, 1923. Serial No. 661,367.

*To all whom it may concern:*

Be it known that I, WILLIAM MILLER, a citizen of the United States of America, residing in the city of Baltimore, State of Maryland, have invented certain new and useful Improvements in Automatic Headlight Controls, of which the following is a specification.

The danger resulting from the blinding effect of the glaring headlights of motor vehicles, has been much discussed, and legislation intended to control and reduce this evil has been passed in almost every State, and many newly devised and improved lighting appliances in the way of shutters and lenses, reflectors and shades, have been produced and offered for sale, with very little advance in the way of obtaining sufficient illumination for the benefit of the driver of the vehicle carrying the lights without dangerously blinding the drivers of the vehicles moving in the opposite direction by the glare thus produced.

One of the circumstances controlling this condition is that whatever may be done in the way of turning the rays of the lights downward to avoid the eyes of the drivers of passing vehicles, which is the commonest and probably the most effective expedient, the attempt at correction of the headlight glare becomes wholly ineffective on account of the wide variation of the vertical angle at which vehicles approach each other in climbing hills, and particularly as the respective vehicles pass the tops of the hills over the change of incline.

The present invention relates to a device for automatically controlling the headlights in correspondence with the fore and aft angle of the vehicle with the radius of the earth; in other words, it relates to a gravity operated device involving the principles of the wellknown carpenter's level or plumb whereby the lights are controlled, in the form of the invention shown a shutter being lowered or the lights being automatically dimmed as the machine is tipped up in climbing a hill, in which position the angles of the rays are so changed, even though they have been markedly depressed to avoid this result, that they enter the eyes and produce a blinding effect on the drivers of approaching vehicles.

In the accompanying drawings I have illustrated two forms of headlight control embodying the features of my invention.

In the accompanying drawings—

Figure 1 is a sectional elevation taken in the direction of the axis of the lens and reflector, showing a headlight with an automatic dimming device in accordance with my invention.

Figure 2 is a corresponding section through an automatically controlled shutter embodying the same principle of control.

Figure 3 is a plan of the same.

Figure 4 is a front elevation of this device, and

Figure 5 is a fragmentary view of an automobile showing the application of the automatic shutter.

Referring to the drawings by numerals and having particular reference to the disclosure of Figure 1, I have shown a reflector 1, an electric bulb 2 in the usual position therein, the illustration of these features being more or less diagrammatic, a source of electricity, as a battery 3 and connections 4, 5 from the battery to the lighting bulb, the connection 5 including the gravity-controlled device of my invention whereby a resistance coil 6 is cut into and out of the circuit as the level of the vehicle changes. This gravity-controlled device includes a forwardly and downwardly inclined track composed of a plurality of parallel steel rods 7 preferably 4 in number, inclined forwardly and downwardly as aforesaid, and extending in the general direction of the motion of the vehicle. The arrangement of these rods is shown in dotted lines in front elevation in Figure 4, though other details of the apparatus are different from those shown in Figure 1, and they are further shown in plan in Figure 3, though the electrical apparatus shown in Figure 1 can be conveniently actuated by means of a single ball and track in place of the plurality of these members as shown in Figures 3 and 4.

The ball 8 is of heavy metal, preferably and most conveniently of steel, and in operation rolls back and forth on the track 7 in the direction of the motion of the vehicle controlled by the vertical angle of the same to the radius of the earth. The ball, as shown, is enclosed within a carriage or bracket 9 carrying a spring-controlled follower 10 which rides on a contact rod 11, which is formed of two separate conductor members 12, 13 at the opposite ends, separated by an intermediate insulating member 14. This track is, as shown, connected at the forward end to the light by a conductor 15, which is part of the previously described connection 5, and this conductor 15 is connected between the light and the forward end 12 of the contact rod 11 to one end of the resistance 6, the other end of the resistance being connected to the rear end 13 of the contact rod 11. The ball track 7 is connected in turn to the opposite terminal of the battery 3, being the connection referred to by reference numeral 5.

In operation, assuming that the vehicle is placed on a horizontal fore and aft plane, the apparatus would take approximately the position in which it is shown in Figure 1, that is, the ball 8 remains near the forward end of the track 7, the follower 10 controlled by the spring 16 engaging the forward conducting section 12 of the contact rod 11. In this position of the apparatus, assuming that the conductor 5 is connected to the plus side of the battery, the current will pass through the conductor 5 to the track 7, to the ball and to the carriage 9, and by way of the follower 10, which is necessarily of conducting material, to the conducting section 12 of the rod 11, thence to the conductor 15, to the light 2, then back to the battery by the connection 4.

Now assuming that the vehicle is climbing a hill, change of angle will move the ball to the rear end of the track 7, in which position the follower 10 will engage the rear conducting section 13 of the rod 12, being separated electrically from the conducting section 12 thereof by the insulating material 14. In this position of the apparatus the current will pass from the battery 3 through the conductor 5 to the track 7, and thence by way of the follower 10 to the conducting section 13 of the rod 11, and thence through the resistance 6 to the conductor 15 and to the light 2, returning by the conductor 4 to the battery.

It is apparent that in the first position of the apparatus described, the bulb 2 will receive the full current from the battery, and that in the second position it will receive a lesser current reduced by the resistance 6.

In Figures 2, 3 and 4 I have illustrated a gravity-controlled shutter 20 moving up and down in vertical guides 22 in the headlight casing, the shutter having its lower edge 23 normally, i. e., in its upper position, substantially on a level with the axis of the bulb 2. The shutter 20 is moved up and down by a flexible tension member or cord 24 passing over pulleys 25, 26, 27, and connected at 28 to the ball carriage 29 actuated by balls 8 moving on inclined tracks 7 as previously described.

It is obvious from the previous description of the apparatus that as the ball moves back and forth along the tracks 7, occupying a forward depressed end of the tracks when the vehicle sets on a level and moving to the rear end as the vehicle is tipped up in climbing a hill, that the shutter will be controlled in accordance with the same principle disclosed in connection with the discussion of the dimming of the headlight bulb, taking its uppermost position when the vehicle is level and moving downward as the vehicle is tipped up, serving to depress the rays or cut off the uppermost rays, confining illumination to the desired area in front of the machine and preventing the passage of the blinding rays upward as the vehicle is tipped upward, so that contact of these rays with the eyes of the drivers of passing vehicles is prevented in every instance.

I have thus described specifically and in detail two embodiments of my invention in order that the nature and operation of the same may be clearly understood. However, the specific terms herein are used descriptively rather than in a limiting sense, the scope of the invention being defined in the claims.

What I claim and desire to secure by Letters Patent is:

1. In a vehicle headlight, a source of illumination, a track inclined in the direction of motion of the vehicle, a gravity-controlled member moving along said track in response to the variations of the fore and aft line of the vehicle with the earth, means operated by the movement of said gravity-controlled member along said track to control the source of illumination.

2. In a headlight for road vehicles, an electric bulb, a track inclined in the direction of motion of the vehicle, a gravity-controlled member moving along said track, a resistance member, a contact member having two conducting sections which are electrically disconnected, means on said gravity-controlled member moving along said contact member from one section to the other in response to the action of said gravity-controlled member, a source of electricity, and connections from said source of electricity to the light bulb, including a resistance member and a gravity-controlled member 3, the motion of the latter cuts out the resistance when the vehicle sets on level, and cuts it in when the vehicle is tipped up at the forward end, as in climbing hills.

3. In a headlight for motor vehicles, a lighting bulb, a source of electricity, a gravity-controlled member moving back and forth in response to variations of the fore and aft angle of the vehicle with the radius of the earth, connections from the source of electricity to the lighting bulb, including a resistance and means including a contact member carried by the gravity-controlled member for cutting the resistance out of circuit with the light when the vehicle sets on a level and cutting the resistance into the circuit when the forward end of the vehicle is tipped up as in hill climbing.

Signed by me at Baltimore, Maryland, this 5th day of September, 1923.

WILLIAM MILLER.

Witnesses:
PORTER H. FLAUTT,
MARY MILLER.